(12) United States Patent
Yu et al.

(10) Patent No.: US 8,345,787 B2
(45) Date of Patent: Jan. 1, 2013

(54) METHOD AND APPARATUS FOR TRANSMITTING SIGNALS IN A MULTI-HOP WIRELESS COMMUNICATION SYSTEM

(75) Inventors: Tak-Ki Yu, Yongin-si (KR); Eun-Yong Kim, Hwaseong-si (KR); Sang-Min Lee, Seoul (KR); Myeon-Kyun Cho, Seongnam-si (KR); Sae-Young Chung, Daejeon (KR); Sang Won Choi, Daejeon (KR)

(73) Assignees: Samsung Electronics Co., Ltd, Suwon-Si (KR); Korea Advanced Institute of Science and Technology, Daejeon (KR)

( * ) Notice: Subject to any disclaimer, the term of this patent is extended or adjusted under 35 U.S.C. 154(b) by 770 days.

(21) Appl. No.: 12/384,286

(22) Filed: Apr. 2, 2009

(65) Prior Publication Data
US 2009/0252243 A1    Oct. 8, 2009

(30) Foreign Application Priority Data
Apr. 2, 2008 (KR) .................. 10-2008-0030665

(51) Int. Cl.
H04B 7/02 (2006.01)

(52) U.S. Cl. ........................ 375/267; 375/260

(58) Field of Classification Search .......... 375/267, 375/260, 346, 348; 370/335, 315, 492; 455/11.1, 455/15, 63.1, 114.2; 714/48, 799
See application file for complete search history.

(56) References Cited

U.S. PATENT DOCUMENTS

| | | | |
|---|---|---|---|
| 8,000,282 B2 * | 8/2011 | Chindapol et al. | 370/315 |
| 2003/0125067 A1 * | 7/2003 | Takeda et al. | 455/522 |
| 2005/0265387 A1 * | 12/2005 | Khojastepour et al. | 370/467 |
| 2006/0165189 A1 * | 7/2006 | Tamaki et al. | 375/260 |
| 2008/0227461 A1 * | 9/2008 | Dayal et al. | 455/452.2 |
| 2008/0273512 A1 * | 11/2008 | Attar et al. | 370/342 |
| 2008/0285500 A1 * | 11/2008 | Zhang et al. | 370/315 |
| 2010/0002618 A1 * | 1/2010 | Eichinger et al. | 370/315 |

* cited by examiner

Primary Examiner — Shuwang Liu
Assistant Examiner — Helene Tayong

(57) ABSTRACT

A method and apparatus for transmitting signals in a multi-hop wireless communication system are provided. A first BS transmits a signal including a first common information codeword and a first private information codeword. A second BS transmits a signal including a second common information codeword and a second private information codeword. A first RS joint-decodes the first common information codeword and the second common information codeword and decodes the first private information codeword. A second RS joint-decodes the first common information codeword and the second common information codeword and decodes the second private information codeword.

19 Claims, 9 Drawing Sheets

METHOD AND APPARATUS FOR TRANSMITTING SIGNALS IN A MULTI-HOP WIRELESS COMMUNICATION SYSTEM

CROSS-REFERENCE TO RELATED APPLICATION(S) AND CLAIM OF PRIORITY

The present application claims priority under 35 U.S.C. §119(a) to a Korean Patent Application filed in the Korean Intellectual Property Office on Apr. 2, 2008 and assigned Serial No. 10-2008-0030665, the contents of which are herein incorporated by reference.

TECHNICAL FIELD OF THE INVENTION

The present invention relates to a signal transmission/reception apparatus and method for transmitting signals in a Super Position Coding and Successive Interference Cancellation (SPC-SIC) based scheme and supporting Dirty Paper Coding (DPC) based on SPC in a multi-hop wireless communication system.

BACKGROUND OF THE INVENTION

In a cellular based multi-hop wireless communication system, the main focus of legacy technologies is that a Mobile Station (MS) in service in one cell enhances the overall cell throughput by help of a Relay Station (RS). For example, RS-based cooperative relay schemes, cooperative signal-source diversity, cooperative transmission diversity, cooperative complex diversity, and the like, have been proposed and adopted for the purpose of obtaining diversity. Additionally, to obtain a multiplexing gain, a technique using a multiplexing technology in a Multi Input Multi Output (MIMO) system has been proposed.

In the cellular based multi-hop wireless communication system, the proposed conventional technologies all deal with MS's transmission in one cell and put focus on the enhancement of reliability or transmission rate in one cell. Accordingly, an MS in a cell boundary area essentially is subjected to interference from a neighboring RS and thus, has a problem that this interference leads to a decrease of a throughput of the cell boundary area, therefore causing a decrease of the overall throughput. Further, under circumstances where an RS is introduced to enhance a transmission rate of an MS of a cell boundary area, when considering a relatively low Signal to Noise Ratio (SNR) compared with single hop communication, a failure to effectively cancel such interference may cause a big loss in the overall throughput. Thus, there is a demand for a method and apparatus for effectively canceling interference and enhancing a transmission rate in a multi-hop wireless communication system.

SUMMARY OF THE INVENTION

To address the above-discussed deficiencies of the prior art, it is a primary aspect of the present invention is to provide a method and apparatus for maximizing the transmission efficiency of signals in a multi-hop wireless communication system.

Another aspect of the present invention is to provide a method and apparatus for generating a plurality of codewords for signal transmission and enhancing a throughput of communication using the plurality of codewords in a multi-hop wireless communication system.

The above aspects are achieved by providing a method and apparatus for transmitting signals in a multi-hop wireless communication system.

According to one aspect of the present invention, a multi-hop wireless communication system is provided. The system includes a first Base Station (BS), a second BS, a first Radio Station (RS), and a second RS. The first BS transmits a signal including a first common information codeword and a first private information codeword to the first RS and the second RS. The second BS transmits a signal including a second common information codeword and a second private information codeword to the first RS and the second RS. The first RS joint-decodes the first common information codeword and the second common information codeword and decodes the first private information codeword. The second RS joint-decodes the first common information codeword and the second common information codeword and decodes the second private information codeword.

According to another aspect of the present invention, an operation method of a BS in a multi-hop wireless communication system is provided. The method includes transmitting a signal including a first common information codeword and a second private information codeword to a first Radio Station (RS) and a second RS.

According to a further aspect of the present invention, an operation method of a Radio Station (RS) in a multi-hop wireless communication system is provided. The method includes joint-decoding a first common information codeword received from a first Base Station (BS) and a second common information codeword received from a second BS, and decoding a first private information codeword.

According to yet another aspect of the present invention, an operation method of a Mobile Station (MS) in a multi-hop wireless communication system is provided. The method includes receiving a signal including a first private information codeword comprised of $x_{1pc}$ and $x_{1pp}$ and a first common information codeword transmitted by a first RS, and a signal including a first private information codeword comprised of $x_{2pc}$ and $x_{2pp}$ and a first common information codeword transmitted by a second RS, joint-decoding the first common information codeword and the second common information codeword, joint-decoding the $x_{1pc}$ and $x_{2pc}$, and decoding the $x_{1pp}$.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention relates to transmission schemes of a BS and a RS in a cellular based two-hop communication system. Exemplary embodiments of the present invention are applicable to uplink and downlink. The assumption is that, in the two-hop communication system, the RS operates by Decode and Forward (DF) and is based on a Half Duplex Mode (HDM). For description convenience, exemplary embodiments of the present invention assume two BSs, two RSs, and two MSs.

A scheme based on A Super Position Coding and Successive Interference Cancellation (SPC-SIC) according to an exemplary embodiment of the present invention is described below. The SPC-SIC scheme is that, when two BSs transmit signals to two RSs and the two RSs transmit signals to the two BSs, they do not transmit one codeword but generate two or more kinds of codewords, allocate power, and superpose and transmit the codewords.

A relationship between a BS and an RS in two-hop communication can be expressed as in Equation 1:

$$r_1 = h_{11}x_1 + h_{21}x_2 + m_1,$$

$$r_2 = h_{12}x_1 + h_{22}x_2 + m_2,$$

$$y_1 = g_{11}x'_1 + g_{21}x'_2 + n_1,$$

$$y_2 = g_{12}x'_1 + g_{22}x'_2 + n_2$$ [Eqn. 1]

In Equation 1, the '$x_i$' represents a transmit signal of a BSi, the '$x'j$' represents a transmit signal of an RSj, the '$y_p$' represents a receive signal of an RSp, the '$y_q$' represents a receive signal of an MSq, the '$h_{ij}$' represents a channel from the BSi to the RSj, the '$g_{pq}$' represents a channel from the RSp to the MSq, and the '$m_i$' and '$n_j$' represent noise. In the following description, the maximum transmit powers of the BSi and RSj are given as '$P_i$' and '$Q_j$', respectively. In addition, it is assumed that the '$m_i$' and '$n_j$' have distributions whose means are equal to '0' and variances are equal to '1', and are independent of each other.

Figure 1:
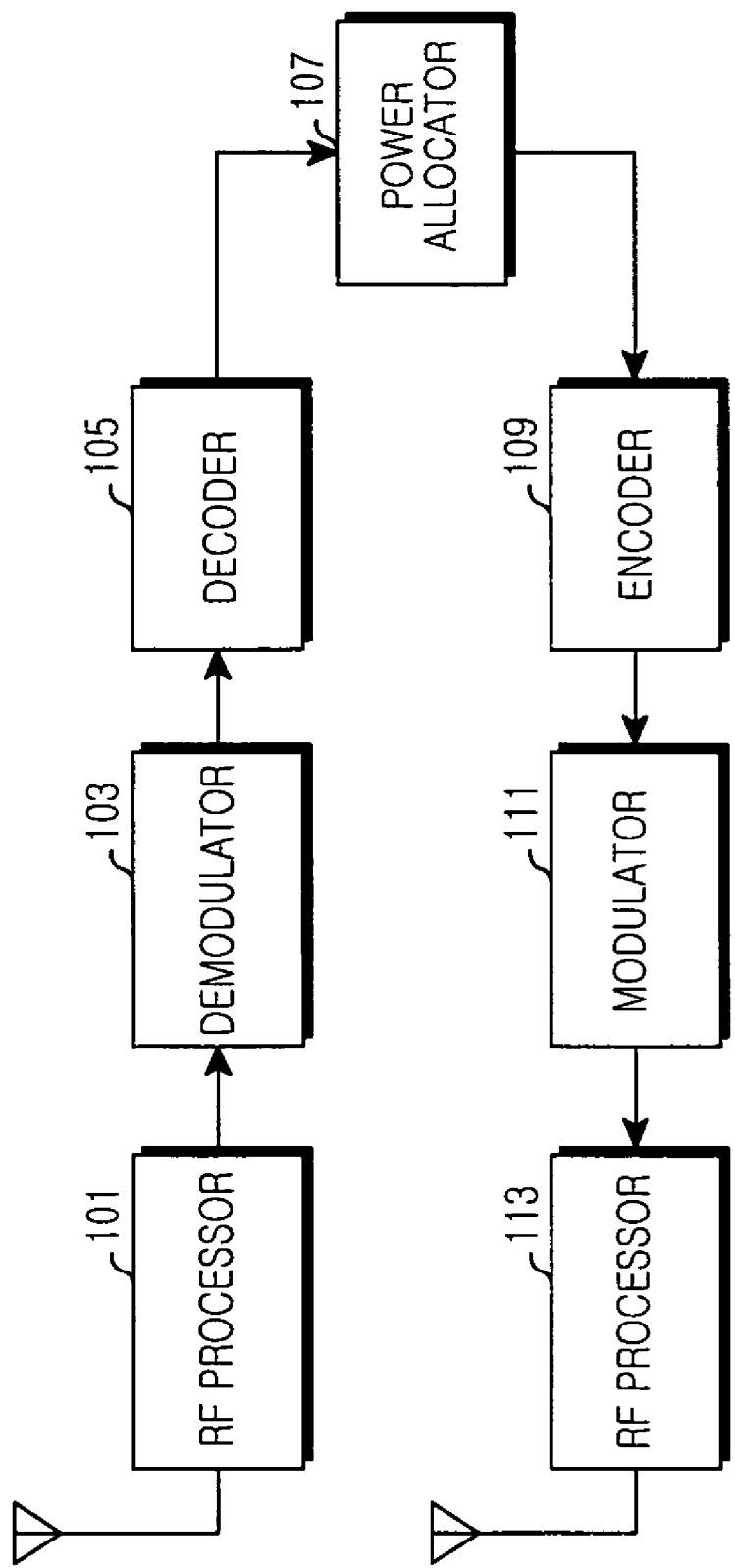
FIG. 1 is a block diagram illustrating a construction of a base station in a multi-hop wireless communication system according to an exemplary embodiment of the present invention.

FIG. 1 is a block diagram illustrating a construction of a BS in a multi-hop wireless communication system according to an exemplary embodiment of the present invention.

Referring to FIG. 1, the BS includes a Radio Frequency (RF) processor 101, a demodulator 103, a decoder 105, a power allocator 107, an encoder 109, a modulator 111, and an RF processor 113.

The RF processor 101 down-converts an RF band signal received through an antenna into a baseband signal. The demodulator 103 converts complex symbols into a bit stream. The decoder 105 decodes the bit stream. The power allocator 107 allocates power for external devices. Particularly, according to an exemplary embodiment of the present invention, the power allocator 107 determines each of transmit powers of codewords generated by the encoder 109. The encoder 109 encodes a transmit bit stream to generate two or more kinds of codewords. The generated codewords include a common information codeword and a private information codeword. The modulator 111 converts the encoded bit stream into complex symbols. The RF processor 113 up-converts a baseband signal into an RF band signal and transmits the RF band signal through an antenna.

Figure 2:
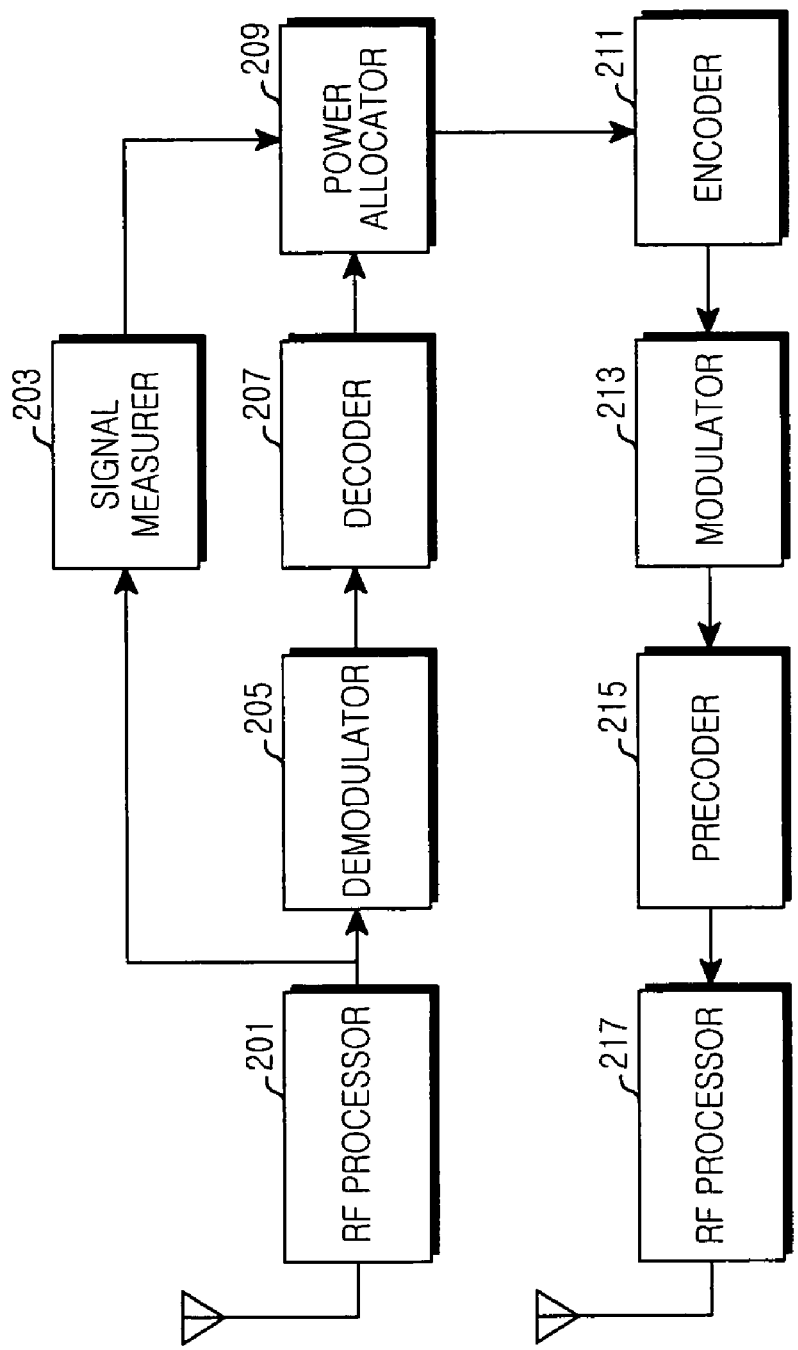
FIG. 2 is a block diagram illustrating a construction of a relay station in a multi-hop wireless communication system according to an exemplary embodiment of the present invention.

FIG. 2 is a block diagram illustrating a construction of an RS in a multi-hop wireless communication system according to an exemplary embodiment of the present invention.

Referring to FIG. 2, the RS includes an RF processor 201, a signal measurer 203, a demodulator 205, a decoder 207, a power allocator 209, an encoder 211, a modulator 213, a precoder 215, and an RF processor 217.

The RF processor 201 down-converts an RF band signal received through an antenna into a baseband signal. The signal measurer 203 measures a Signal to Interference and Noise Ratio (SINR) for each of two BSs using pilot symbols that are included in signals received from the two BSs and then, provides the SINRs to the power allocator 209.

For example, if the RS is a first RS, an SINR is measured as in Equation 2 below:

$$SINR_{11} = \frac{|h_{11}|^2 P_1}{1 + |h_{21}|^2 P_2},$$

$$SINR_{12} = \frac{|h_{21}|^2 P_2}{1 + |h_{11}|^2 P_1}.$$ [Eqn. 2]

In Equation 2, the '$h_{11}$' represents a channel from a first BS to the first RS, the '$h_{21}$' represents a channel from a second BS to the first RS, the '$P_1$' represents the maximum transmit power of the first BS, and the '$P_2$' represents the maximum transmit power of the second BS.

Similarly, if the RS is a second RS, an SINR is measured as in Equation 3 below:

$$SINR_{21} = \frac{|h_{22}|^2 P_2}{1+|h_{12}|^2 P_1},$$

$$SINR_{22} = \frac{|h_{12}|^2 P_2}{1+|h_{22}|^2 P_1}.$$

[Eqn. 3]

In Equation 3, the '$h_{12}$' represents a channel from the first BS to the second RS, the '$h_{22}$' represents a channel from the second BS to the second RS, the '$P_1$' represents the maximum transmit power of the first BS, and the '$P_2$' represents the maximum transmit power of the second BS.

The demodulator 205 converts complex symbols into a bit stream. The decoder 207 decodes the bit stream. The power allocator 209 allocates power for external devices. Particularly, according to an exemplary embodiment of the present invention, the power allocator 209 determines a transmit power of each of codewords generated by the encoder 211. The power allocator 209 provides the SINRs received from the signal measurer 203, to the encoder 211.

The encoder 211 encodes a transmit bit stream to generate two or more kinds of codewords. The modulator 213 converts encoded bit stream into complex symbols. In order to prevent the occurrence of interference within the system or the occurrence of an error of the final result value, the precoder 215 may performs signal process using Dirty Paper Coding (DPC) technique. The DPC technique is a technique for, under assumption a transmit end is previously aware of information on interference, previously performing encoding in consideration of a distortion caused by the interference, thereby enabling a receive end to achieve a reception effect with no interference. In an exemplary embodiment of the present invention, because two RSs have identical information that is common information, the RSs separated from each other can effectively cancel interference utilizing the DPC technique in cooperation with each other. The RF processor 217 up-converts a baseband signal into an RF band signal and transmits the RF band signal through an antenna.

Figure 3:
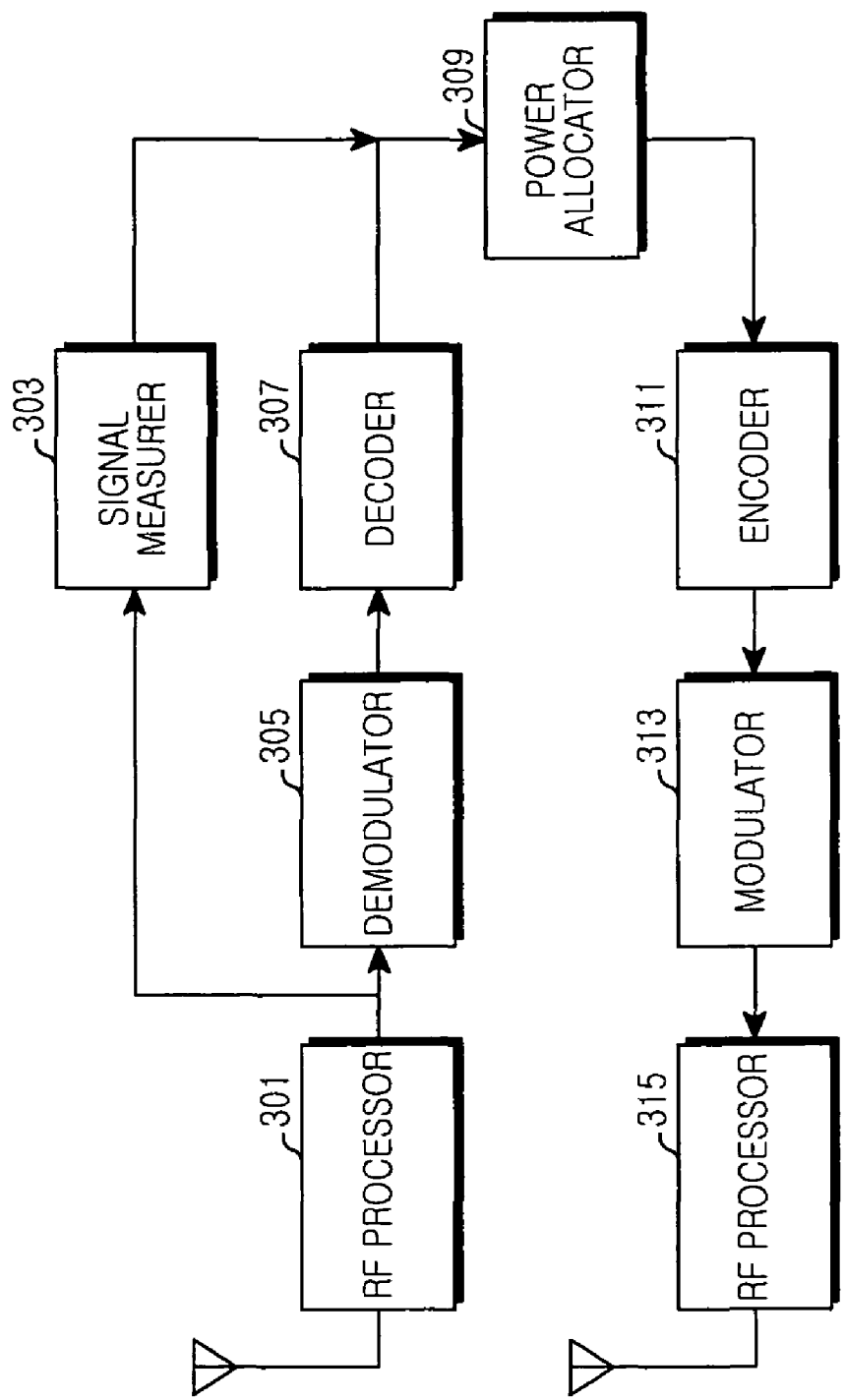
FIG. 3 is a block diagram illustrating a construction of a mobile station in a multi-hop wireless communication system according to an exemplary embodiment of the present invention.

FIG. 3 is a block diagram illustrating a construction of an MS in a multi-hop wireless communication system according to an exemplary embodiment of the present invention.

Referring to FIG. 3, the MS includes an RF processor 301, a signal measurer 303, a demodulator 305, a decoder 307, a power allocator 309, an encoder 311, a modulator 313, and an RF processor 315.

The RF processor 301 down-converts an RF band signal received through an antenna into a baseband signal. The signal measurer 303 measures an SINR for each of two BSs using pilot symbols that are included in signals received through the two BSs and then, provides the SINRs to the power allocator 309.

For example, if the MS is a first MS, an SINR is measured as in Equation 4 below:

$$SINR_{11} = \frac{|g_{11}|^2 Q_1}{1+|g_{21}|^2 Q_2},$$

$$SINR_{12} = \frac{|g_{21}|^2 Q_2}{1+|g_{11}|^2 Q_1}.$$

[Eqn. 4]

In Equation 4, the '$g_{11}$' represents a channel from a first RS to the first MS, the '$g_{21}$' represents a channel from a second RS to the first MS, the '$Q_1$' represents the maximum transmit power of the first RS, and the '$Q_2$' represents the maximum transmit power of the second RS.

Similarly, if the MS is a second MS, an SINR is measured as in Equation 5 below:

$$SINR_{21} = \frac{|g_{22}|^2 Q_2}{1+|g_{12}|^2 Q_1},$$

$$SINR_{22} = \frac{|g_{12}|^2 Q_2}{1+|g_{22}|^2 Q_1}.$$

[Eqn. 5]

In Equation 5, the '$g_{12}$' represents a channel from the first RS to the second MS, the '$g_{22}$' represents a channel from the second RS to the second MS, the '$Q_1$' represents the maximum transmit power of the first RS, and the '$Q_2$' represents the maximum transmit power of the second RS.

The demodulator 305 converts complex symbols into bit stream. The decoder 307 decodes the bit stream. The power allocator 309 allocates power for external devices. The encoder 311 encodes a transmit bit stream. The modulator 313 converts the encoded bit stream into complex symbols. The RF processor 315 up-converts a baseband signal into an RF band signal and transmits the RF band signal through an antenna.

Figure 4:
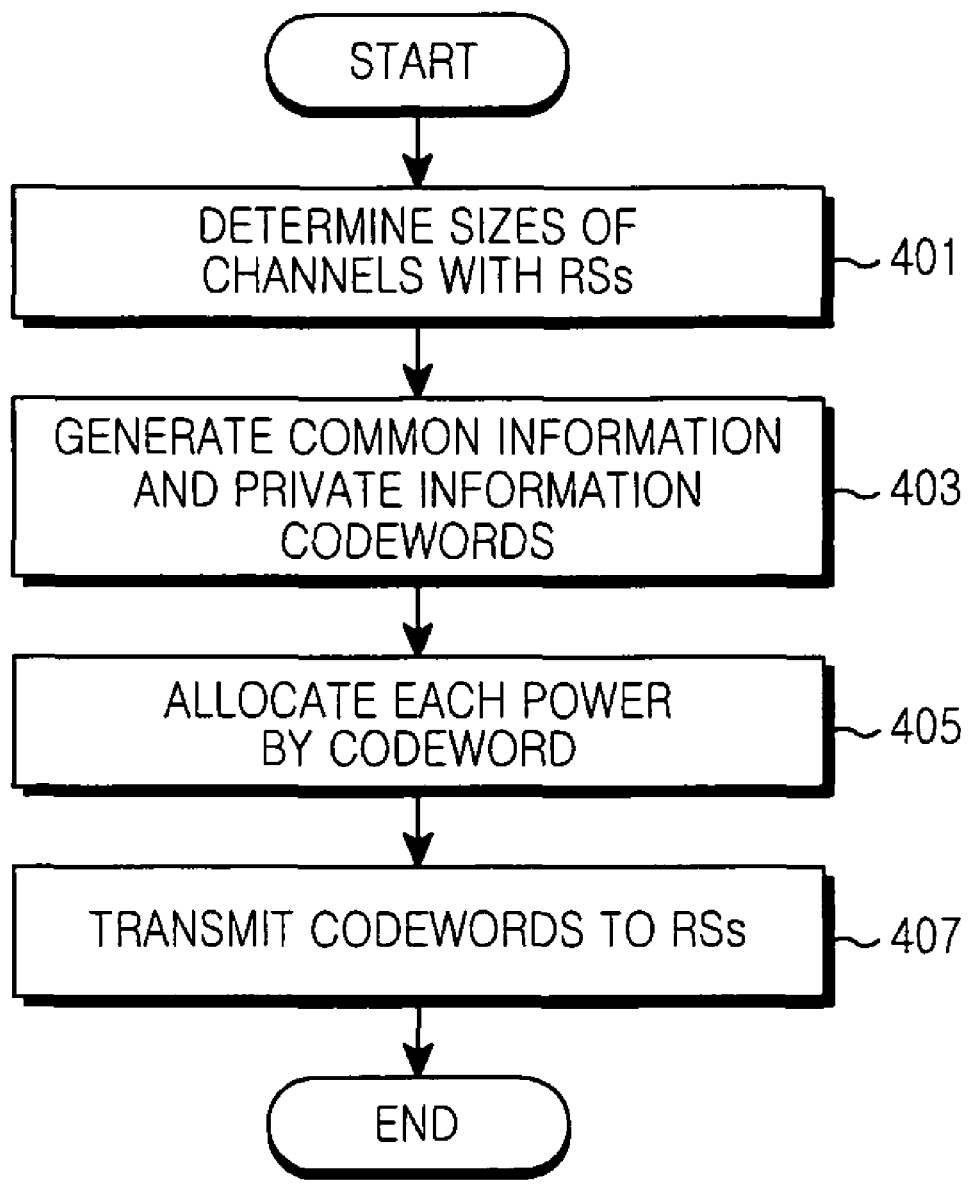
FIG. 4 is a flowchart illustrating an operation process of a base statin in a multi-hop wireless communication system according to an exemplary embodiment of the present invention.

FIG. 4 is a flowchart illustrating an operation process of a BS in a multi-hop wireless communication system according to an exemplary embodiment of the present invention. FIG. 4 illustrates a common operation process of a first BS and a second BS. For matters requiring distinguishing the first BS and the second BS, these are separately described below.

Referring to FIG. 4, in step 401, the BS determines sizes of channels with RSs. In a first hop, it is enough that the BS is aware of only a size of a channel to obtain channel information. To enhance the overall throughput, there is a need to additionally feed phase information back. The sizes of the channels are acquired through the following procedure. A first RS measures SINRs for respective BSs as in Equation 2 using pilot symbols transmitted by a first BS and a second BS. The first RS feeds the SINRs back to the first BS and the second BS. A second RS measures SINRs as in Equation 3 and then, feeds the SINRS back to the first BS and the second BS. The first BS and the second BS forward part of measurements of the SINRs that are fed back from the first RS and second RS. In other words, the first BS forwards, to the first RS, SINRs for a channel between the second BS and the second RS and a channel between the first BS and the second RS. The second BS forwards, to the second RS, SINRs for a channel between the second BS and the first RS and a channel between the first BS and the first RS. Accordingly, the first RS, the second RS, the first BS, and the second BS all acquire SINRs for all first-hop channels.

Then, in step 403, the BS generates two or more kinds of codewords. The codewords include common information codewords and private information codewords. The common information codeword is a codeword transmitted to all nodes with no destination node and the private information codeword is a codeword transmitted only to a destination node.

Then, in step 405, the BS allocates each power by each codeword. It is determined that power of the private information codeword is equal to $$\min\left(\frac{k_1}{|h_{12}|^2}, P_1\right)$$

for the first BS and is equal to $$\min\left(\frac{k_1}{|h_{21}|^2}, P_2\right)$$

for the second BS. It is determined that power of the common information codeword is equal to $P_1-P_{1P}$ for the first BS and is equal to $P_2-P_{2P}$ for the second BS. Here, the '$h_{12}$' represents a channel coefficient between the first BS and the second RS, the '$P_1$' represents the maximum transmit power of the first BS, the '$h_{21}$' represents a channel coefficient between the second BS and the first RS, the '$P_2$' represents the maximum transmit power of the second BS, the '$k_1$' represents a weight of the private information codeword power, the '$P_{1P}$' represents a private information codeword transmit power of the first BS, and the '$P_{2P}$' represents a private information codeword transmit power of the second BS. Desirably, the '$k_1$' is set to '1' because a high throughput is obtained when the '$k_1$' is determined to be equal to a variance value of noise added from an RS.

Then, in step 407, the BS transmits the respective codewords to the RSs. That is, the BS applies the determined powers of step 405 and transmits a signal that is a sum of the private information codeword and the common information codeword. The private information codeword is regarded as interference or noise for a node except a target node.

Figure 5:
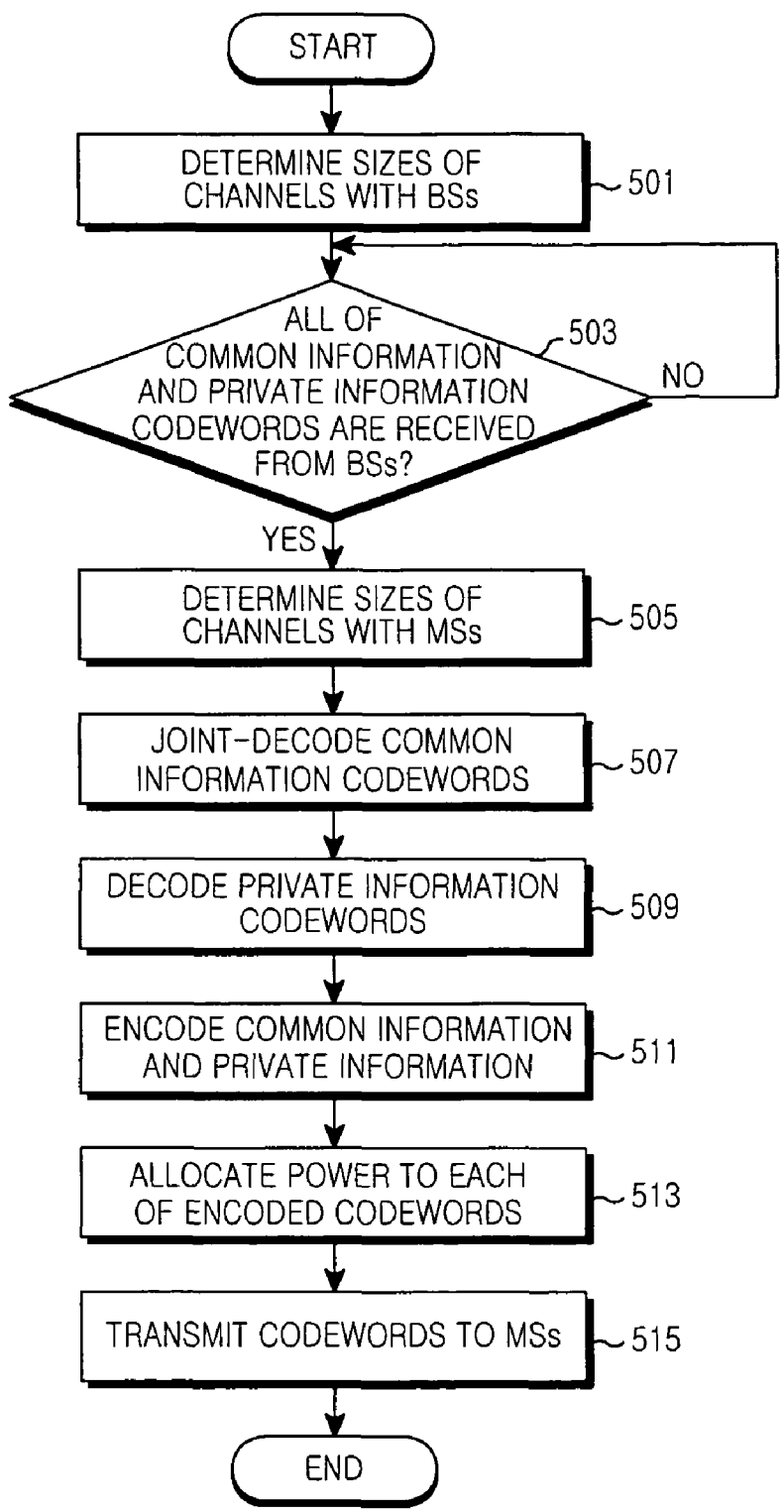
FIG. 5 is a flowchart illustrating an operation process of a relay station in a multi-hop wireless communication system according to an exemplary embodiment of the present invention.

FIG. 5 is a flowchart illustrating an operation process of an RS in a multi-hop wireless communication system according to an exemplary embodiment of the present invention. FIG. 5 illustrates a common operation process of a first RS and a second RS. For matters requiring distinguishing the first RS and the second RS, these are separately described below.

Referring to FIG. 5, in step 501, the RS determines sizes of channels with BSs. The sizes of the channels are acquired through the following procedure. A first RS measures SINRs for the respective BSs as in Equation 2 using pilot symbols transmitted by a first BS and a second BS. The first RS feeds the SINRs back to the first BS and the second BS. A second RS measures SINRs as in Equation 3 and then, feeds the SINRS back to the first BS and the second BS. The first BS and the second BS forward part of measurements of the SINRs that are fed back from the first RS and the second RS. In other words, the first BS forwards, to the first RS, SINRs for a channel between the second BS and the second RS and a channel between the first BS and the second RS. The second BS forwards, to the second RS, SINRs for a channel between the second BS and the first RS and a channel between the first BS and the first RS. Accordingly, the first RS, the second RS, the first BS, and the second BS all acquire SINRs for all channels of a first hop.

Then, in step 503, the RS determines if all of common information codewords and private information codewords are received from the first BS and the second BS.

Then, in step 505, the RS determines sizes of channels with MSs. In other words, the RS receives feedbacks of SINRs from a first MS and a second MS. The sizes of the channels are acquired through the following procedure. The first MS measures SINRs for respective RSs as in Equation 4 using pilot symbols transmitted by the first RS and the second RS. The first MS feeds the SINRs back to the first RS and the second RS. The second MS measures SINRs as in Equation 5 and then, feeds the SINRS back to the first RS and the second RS. The first RS and the second RS forward part of measurements of the SINRs that are fed back from the first MS and the second MS. In other words, the first RS forwards, to the first MS, SINRs for a channel between the second RS and the second MS and a channel between the first RS and the second MS. The second RS forwards, to the second MS, SINRs for a channel between the second RS and the first MS and a channel between the first RS and the first MS. Accordingly, the first MS, the second MS, the first RS, and the second RS all acquire SINRs for all channels of a second hop.

Then, in step 507, the RS joint-decodes the common information codewords from signals received from BSs. The common information codewords can be decoded at all nodes because there is no target node.

Then, in step 509, the RS decodes the private information codewords from signals received from the BSs. The private information codewords are regarded as interference or noise for a node except a target node.

Then, in step 511, the RS encodes common information and private information by each BS.

Then, in step 513, the RS allocates power to each of the encoded codewords. The first RS and the second RS generate common information codewords ($x_{jc}$(j=1,2)) on the basis of shared common information, and allocate $\alpha_j Q_j$(j=1,2) as power of the common information codewords. The first RS and the second RS generate $x_{jpc}+x_{jpp}$(j=1,2) as private information codewords ($x_{jp}$(j=1,2)). The first RS allocates $\alpha_1 Q_1-(1-\alpha_1)\alpha_2 Q_1$ as power of $x_{1pc}$ and allocates $(1-\alpha_1)\alpha_2 Q_1$ as power of $x_{1pp}$. The second RS allocates $\alpha_2 Q_2-(1-\alpha_2)\alpha_1 Q_2$ as power of $x_{2pc}$ and allocates $(1-\alpha_2)\alpha_1 Q_2$ as power of $x_{2pp}$. The $\alpha_j$(j=1,2) represents a transmit power coefficient of the common information codeword and is a real number between '0' and '1'. The '$Q_1$' represents the maximum transmit power of the first RS, and the '$Q_2$' represents the maximum transmit power of the second RS.

Then, in step 515, the RS transmits the codewords to MSs. In other words, the RS applies the determined power of step 513 and transmits the common information codewords and the private information codewords. That is, the RS transmits $x_{jc}+x_{jpc}+x_{jpp}$(j=1,2).

If communication is performed as above, a transmission rate in the first hop is given as in Equation 6 below:

$$R_{1c} \leq \log_2\left(1+\frac{|h_{11}|^2 P_{1c}}{1+|h_{11}|^2 P_{1p}+|h_{21}|^2 P_{2p}}\right)$$

$$R_{2c} \leq \log_2\left(1+\frac{|h_{21}|^2 P_{2c}}{1+|h_{11}|^2 P_{1p}+|h_{21}|^2 P_{2p}}\right)$$

$$R_{1c}+R_{2c} \leq \log_2\left(1+\frac{|h_{11}|^2 P_{1c}+|h_{21}|^2 P_{2c}}{1+|h_{11}|^2 P_{1p}+|h_{21}|^2 P_{2p}}\right)$$

$$R_{1c} \leq \log_2\left(1+\frac{|h_{12}|^2 P_{1c}}{1+|h_{12}|^2 P_{1p}+|h_{22}|^2 P_{2p}}\right)$$

$$R_{2c} \leq \log_2\left(1+\frac{|h_{22}|^2 P_{2c}}{1+|h_{12}|^2 P_{1p}+|h_{22}|^2 P_{2p}}\right)$$

$$R_{1c}+R_{2c} \leq \log_2\left(1+\frac{|h_{12}|^2 P_{1c}+|h_{22}|^2 P_{2c}}{1+|h_{12}|^2 P_{1p}+|h_{22}|^2 P_{2p}}\right)$$

[Eqn. 6]

-continued $$R_{1p} \le \log_2\left(1 + \frac{|h_{11}|^2 P_{1p}}{1 + |h_{21}|^2 P_{2p}}\right)$$

$$R_{2p} \le \log_2\left(1 + \frac{|h_{22}|^2 P_{2p}}{1 + |h_{12}|^2 P_{1p}}\right)$$

In Equation 6, the '$R_{ic}$' represents a transmission rate of a BSi for common information, the '$R_{ip}$' represents a transmission rate of the BSi for private information, the '$h_{ij}$' represents a channel coefficient between the BSi and an RSj, the '$P_{ic}$' represents a common information codeword transmit power of the BSi, and the '$P_{ip}$' represents a private information codeword transmit power of the BSi.

Figure 6:
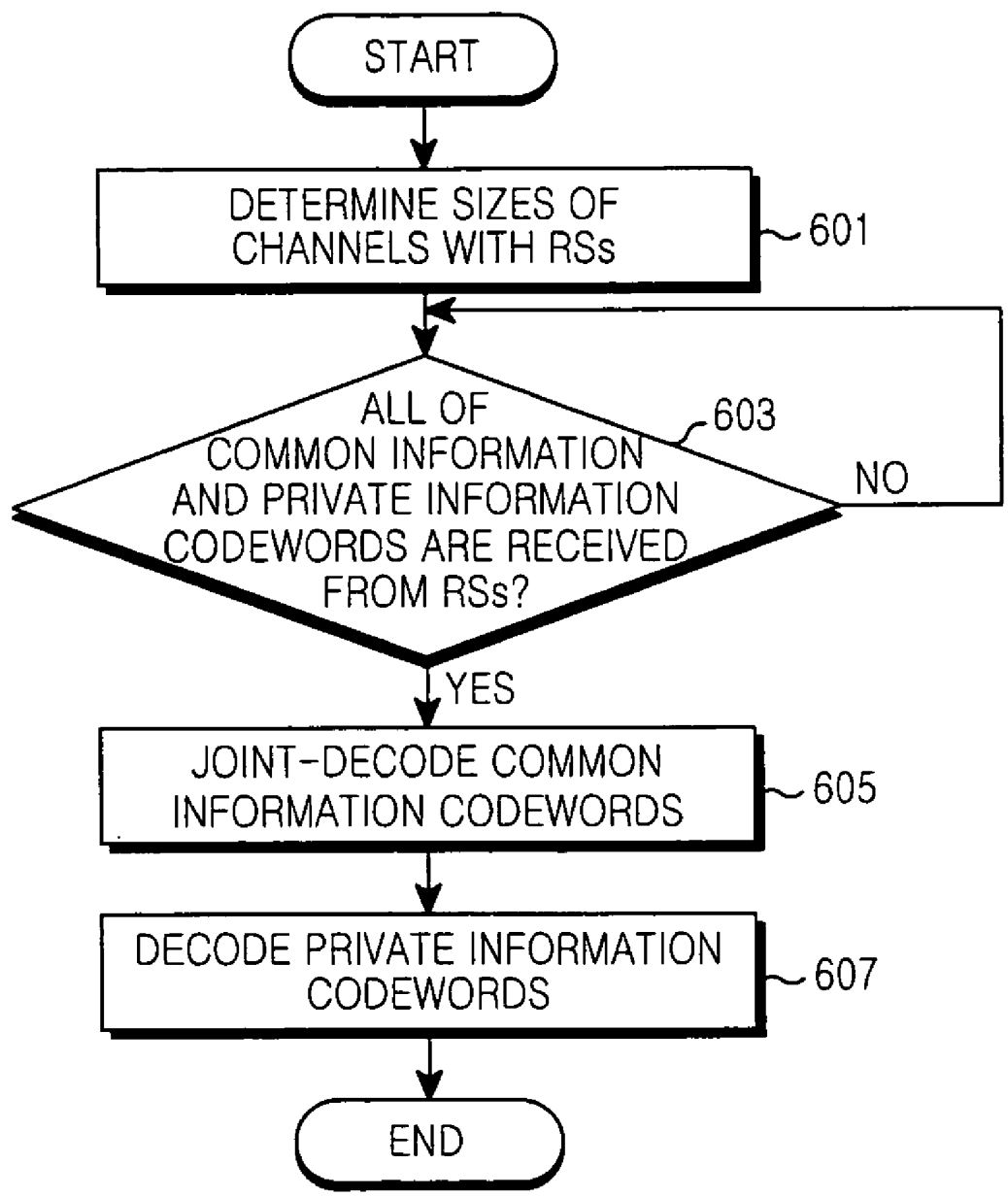
FIG. 6 is a flowchart illustrating an operation process of a mobile station in a multi-hop wireless communication system according to an exemplary embodiment of the present invention.

FIG. 6 is a flowchart illustrating an operation process of an MS in a multi-hop wireless communication system according to an exemplary embodiment of the present invention. FIG. 6 illustrates a common operation process of a first MS and a second MS. For matters requiring distinguishing the first MS and the second MS, these are separately described below.

Referring to FIG. 6, in step 601, the MS determines sizes of channels with RSs. The sizes of the channels are acquired through the following procedure. A first MS measures SINRs for the respective RSs as in Equation 4 using pilot symbols transmitted by a first RS and a second RS. The first MS feeds the SINRs back to the first RS and the second RS. A second MS measures SINRs as in Equation 5 and then, feeds the SINRS back to the first RS and the second RS. The first RS and the second RS forward part of measurements of the SINRs that are fed back from the first MS and the second MS. In other words, the first RS forwards, to the first MS, SINRs for a channel between the second RS and the second MS and a channel between the first RS and the second MS. The second RS forwards, to the second MS, SINRs for a channel between the second RS and the first MS and a channel between the first RS and the first MS. Accordingly, the first MS, the second MS, the first RS, and the second RS all acquire SINRs for all channels of a second hop.

Then, in step 603, the MS determines if all of common information codewords and private information codewords are received from the first RS and the second RS.

Then, in step 605, the MS joint-decodes the common information codewords.

Then, in step 607, the MS decodes the private information codewords at a target node. The private information codewords are regarded as interference or noise for a node except a target node.

If communication is performed as above, a transmission rate in the second hop is given as in Equation 7 below:

$$R_{1c} \le \log_2\left(1 + \frac{|e^{j\theta_1}\sqrt{\alpha Q_1}\, g_{11}|^2}{1 + |g_{11}|^2(1-\alpha)Q_1 + |g_{21}|^2(1-\beta)}\right) \quad [\text{Eqn. 7}]$$

$$R_{2c} \le \log_2\left(1 + \frac{|e^{j\theta_2}\sqrt{\beta Q_2}\, g_{21}|^2}{1 + |g_{11}|^2(1-\alpha)Q_1 + |g_{21}|^2(1-\beta)Q_2}\right)$$

$$R_{1c} + R_{2c} \le \log_2\left(1 + \frac{|e^{j\theta_1}\sqrt{\beta Q_1}\, g_{11}|^2 + |e^{j\theta_2}\sqrt{\beta Q_2}\, g_{21}|^2}{1 + |g_{11}|^2(1-\alpha)Q_1 + |g_{21}|^2(1-\beta)Q_2}\right)$$

$$R_{1c} \le \log_2\left(1 + \frac{|e^{j\theta_1}\sqrt{\beta Q_1}\, g_{11}|^2}{1 + |g_{11}|^2(1-\alpha)Q_1 + |g_{21}|^2(1-\beta)Q_2}\right)$$

$$R_{2c} \le \log_2\left(1 + \frac{|e^{j\theta_2}\sqrt{\beta Q_2}\, g_{21}|^2}{1 + |g_{11}|^2(1-\alpha)Q_1 + |g_{21}|^2(1-\beta)Q_2}\right)$$

$$R_{1c} + R_{2c} \le \log_2\left(1 + \frac{|e^{j\theta_1}\sqrt{\beta Q_1}\, g_{12}|^2 + |e^{j\theta_2}\sqrt{\beta Q_2}\, g_{22}|^2}{1 + |g_{12}|^2(1-\alpha)Q_1 + |g_{22}|^2(1-\beta)Q_2}\right)$$

$$R'_{1c} \le \log_2\left(1 + \frac{|g_{11}|^2 Q'_{1c}}{1 + |g_{11}|^2 Q'_{1p} + |g_{21}|^2 Q'_{2p}}\right)$$

$$R'_{2c} \le \log_2\left(1 + \frac{|g_{21}|^2 Q'_{2c}}{1 + |g_{11}|^2 Q'_{1p} + |g_{21}|^2 Q'_{2p}}\right)$$

$$R'_{1c} + R'_{2c} \le \log_2\left(1 + \frac{|g_{11}|^2 Q'_{1c} + |g_{21}|^2 Q'_{2c}}{1 + |g_{11}|^2 Q'_{1p} + |g_{21}|^2 Q'_{2p}}\right)$$

$$R'_{1c} \le \log_2\left(1 + \frac{|g_{12}|^2 Q'_{1c}}{1 + |g_{12}|^2 Q'_{1p} + |g_{22}|^2 Q'_{2p}}\right)$$

$$R'_{1c} \le \log_2\left(1 + \frac{|g_{22}|^2 Q'_{1c}}{1 + |g_{12}|^2 Q'_{1p} + |g_{22}|^2 Q'_{2p}}\right)$$

$$R'_{1c} + R'_{2c} \le \log_2\left(1 + \frac{|g_{12}|^2 Q'_{1c} + |g_{22}|^2 Q'_{2c}}{1 + |g_{12}|^2 Q'_{1p} + |g_{22}|^2 Q'_{2p}}\right)$$

$$R'_{1p} \le \log_2\left(1 + \frac{|g_{11}|^2 Q'_{1p}}{1 + |g_{21}|^2 Q'_{2p}}\right)$$

$$R'_{2p} \le \log_2\left(1 + \frac{|g_{22}|^2 Q'_{2p}}{1 + |g_{12}|^2 Q'_{1p}}\right)$$

In Equation 7, the '$R_{ic}$' represents a transmission rate of an RSj for shared common information, the '$R'_{ic}$' represents a transmission rate of the RSj for common information by joint-decoding, the '$R'_{ip}$' represents a transmission rate of an RSi for private information, the '$g_{pq}$' represents a channel coefficient between an RSp and an MSq, the '$Q_j$' represents the maximum transmit power of the RSj, the '$\alpha_j$' represents a transmit power coefficient of a common information codeword of the RSj, the '$Q'_{jc}$' represents an $x_{jpc}$ transmit power of the RSj, and the '$Q'_{jp}$' represents an $x_{jpp}$ transmit power of the RSj.

Figure 7:
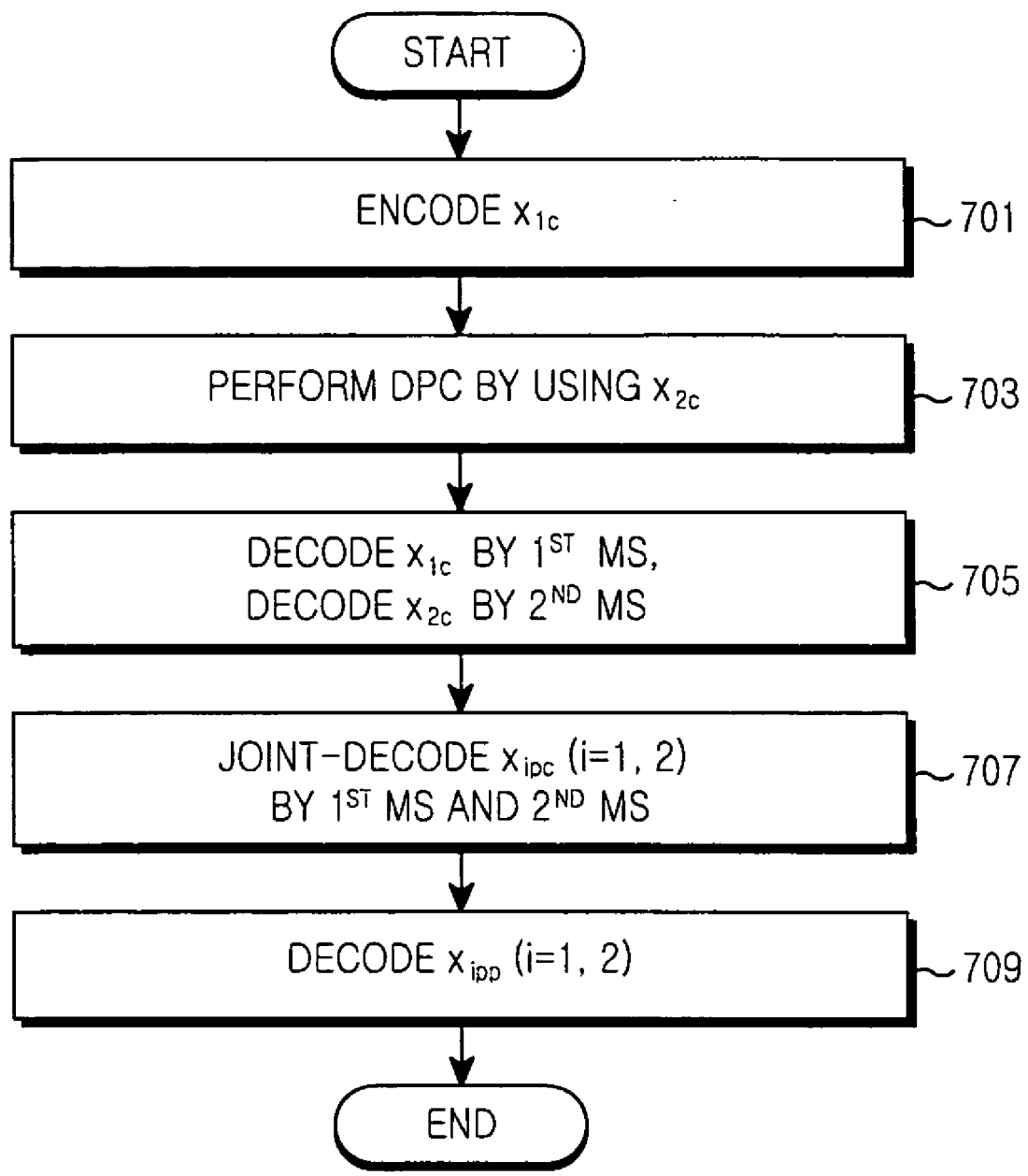
FIG. 7 is a flowchart illustrating an operation process of a relay station in a multi-hop wireless communication system according to another exemplary embodiment of the present invention.

FIG. 7 is a flowchart illustrating an operation process of an RS in a multi-hop wireless communication system according to another exemplary embodiment of the present invention. FIG. 7 illustrates an operation process of an RS and an MS applying DPC. In the following description, an exemplary embodiment of the present invention assume an encoding sequence of $x_{1c} \rightarrow x_{2c}$. FIG. 7 illustrates a common operation process of a first RS and second RS and a first MS and second MS. For matters requiring distinguishing the first RS and the second RS or matters requiring distinguishing the first MS and the second MS, these are separately described below.

Referring to FIG. 7, in step 701, the RS encodes $x_{1c}$.

Then, the RS goes to step 703 and performs DPC using $x_{2c}$. The RS adds $x_{ipc}$ and $x_{ipp}$ to the DPC-processed $x_{1c}$ and transmits the addition result. At this time, the RS multiplies the $x_{1c}$ and the $x_{2c}$ by an adequate phase. Power allocated to each signal is given as in Equation 8 below:

$x_{1c}{:}\alpha_1 Q_1,\ x_{2c}{:}\alpha_2 Q_2,\ x_{1pc}{:}\alpha_3\gamma_1 Q_1,\ x_{1pp}{:}\alpha_3\gamma_2 Q_1;$ 1st RS $x_{1c}{:}\beta_2 Q_2,\ x_{2c}{:}\beta_2 Q_2,\ x_{2pc}{:}\beta_3\delta_1 Q_1,\ x_{2pp}{:}\beta_3\delta_2 Q_1;$ 2nd RS $(\Sigma\alpha_i=1,\ \Sigma\gamma_j=1,\ 0\le\alpha_i\le 1,\ 0\le\gamma_j\le 1,\ i=1,2,3,\ j=1,2)$ [Eqn. 8]

In Equation 8, the '$x_{jc}$' represents common information transmitted by an RSj, the '$x_{jpc}$' and '$x_{jpp}$' represent private information transmitted by the RSj, and the '$\alpha_j$', '$\beta_j$', '$\gamma_j$', and '$\delta_j$' represent arbitrary variables.

Then, in step 705, upon receiving a signal from the RS, the MS decodes the $x_{jc}$. Here, the first MS decodes the $x_{1c}$ and the second MS decodes the $x_{2c}$. The first MS can completely cancel interference caused by the $x_{2c}$ using the characteristic of DPC. Then, in step 707, the MS joint-decodes the $x_{jpc}$. There is no interference effect because interference has been already canceled. Then, in step 709, the MS decodes the $x_{jpp}$.

If communication is implemented as above, a transmission rate in a second hop is given as in Equation 9 below:

$$R_{1c} \leq \log_2\left(1 + \frac{|\sqrt{\alpha_1 Q_1}\, g_{11} e^{j\theta_1} + \sqrt{\beta_1 Q_2}\, g_{21} e^{j\omega_1}|^2}{1 + |g_{11}|^2 \alpha_3 Q_1 + |g_{21}|^2 \beta_3 Q_2)}\right) \quad [\text{Eqn. 9}]$$

$$R_{2c} \leq \log_2\left(1 + \frac{|\sqrt{\alpha_2 Q_1}\, g_{12} e^{j\theta_2} + \sqrt{\beta_2 Q_2}\, g_{22} e^{j\omega_2}|^2}{1 + \left|\begin{array}{c}\sqrt{\alpha_1 Q_1}\, g_{12} e^{j\theta_1} + \\ \sqrt{\beta_1 Q_2}\, g_{22} e^{j\omega_1}\end{array}\right|^2 + |g_{12}|^2 \alpha_3 Q_1 + |g_{22}|^2 \beta_3 Q_2}\right)$$

$$R'_{1c} + R'_{2c} \leq \left(1 + \frac{|g_{11}|^2 \alpha_3 \gamma_1 Q_1 + |g_{21}|^2 \beta_3 \delta_1 Q_2}{1 + |g_{11}|^2 \alpha_3 \gamma_2 Q_1 + |g_{21}|^2 \beta_3 \delta_2 Q_2}\right)$$

$$R'_{1c} + R'_{2c} \leq \left(1 + \frac{|g_{12}|^2 \alpha_3 \gamma_1 Q_1 + |g_{22}|^2 \beta_3 \delta_1 Q_2}{1 + |g_{12}|^2 \alpha_3 \gamma_2 Q_1 + |g_{22}|^2 \beta_3 \delta_2 Q_2 + |\sqrt{\alpha_1 Q_1}\, g_{12} e^{j\theta_1} + \sqrt{\beta_1 Q_2}\, g_{22} e^{j\omega_1}|^2}\right)$$

$$R'_{1p} \leq \left(1 + \frac{|g_{11}|^2 \alpha_3 \gamma_2 Q_1}{1 + |g_{21}|^2 \beta_3 \delta_2 Q_2}\right)$$

$$R'_{2p} \leq \left(1 + \frac{|g_{22}|^2 \beta_3 \delta_2 Q_2}{1 + |g_{12}|^2 \alpha_3 \gamma_2 Q_1 + |\sqrt{\alpha_1 Q_1}\, g_{12} e^{j\theta_1} + \sqrt{\beta_1 Q_2}\, g_{22} e^{j\omega_1}|^2}\right)$$

In Equation 9, the '$R_{ic}$' represents a transmission rate of an RSj for shared common information, the '$R'_{ic}$' represents a transmission rate of the RSj for common information by joint-decoding, the '$R'_{ip}$' represents a transmission rate of an RSi for private information, the '$g_{pq}$' represents a channel coefficient between an RSp and an MSq, the '$Q_j$' represents the maximum transmit power of the RSj, the '$\alpha_j$' represents a transmit power coefficient of a common information codeword of the RSj, the '$Q'_{jc}$' represents an $x_{jpc}$ transmit power of the RSj, and the '$Q'_{jp}$' represents an $x_{jpp}$ transmit power of the RSj.

Figure 8:
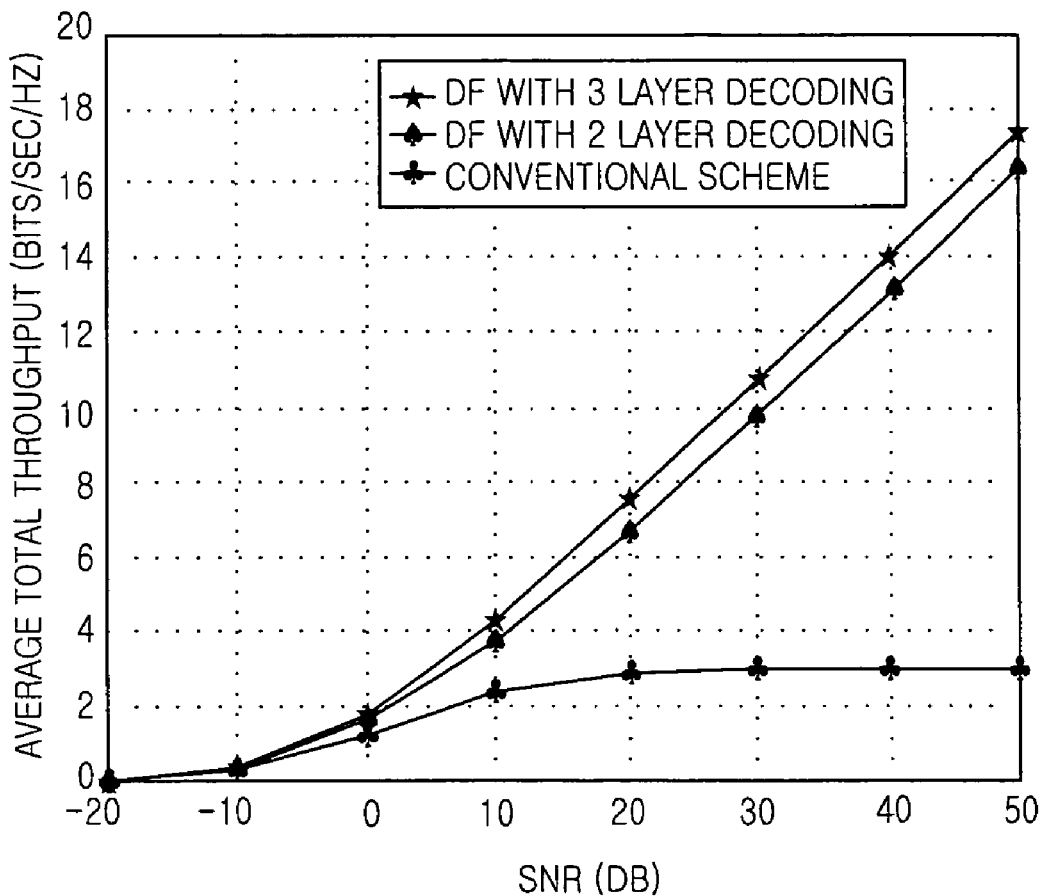
FIG. 8 is a graph illustrating average total throughputs of several transmission schemes in a downlink environment.

FIG. 8 is a graph illustrating average total throughputs of several transmission schemes in a downlink environment. In detail, FIG. 8 illustrates the results obtained on the basis of the following assumption and environment.

The first is that, by Line Of Sight (LOS), a channel environment between a BS and an RS is better than a channel environment between the RS and an MS suffering small scale fading and thus, a transmission rate in a second hop determines the whole transmission rate.

The second is that each node has knowledge of channel gain information through SINR measurement and sharing. An SPC-SIC based transmission scheme relatively less requires channel information than a DPC and SPC-SIC based scheme. Because of such trade-off relationship, one of the two transmission technologies is used targeting a Quality of Service (QoS) intended for use.

The third is that a channel environment of a second hop is assumed to be a Rayleigh fading environment. Performance of DPC and SPC-SIC reflects only a real value of a channel and is compared with the conventional art, and basically shows the same tendency as the Rayleigh fading environment.

The fourth is that a channel constant is generated at $10^4$ times and an average throughput is taken.

The fifth is that the maximum transmit powers of two BSs and two RSs are identical.

As illustrated in FIG. 8, in the conventional art, interference from a different RS is regarded as noise and decoded without cancellation and thus, because of a low SINR, a throughput is low overall. The conventional art shows a low increasing rate without obtaining a high throughput despite an increase of a Signal to Noise Ratio (SNR). Particularly, a two-hop communication system can obtain a relatively high SNR even in a cell boundary area compared to a single-hop communication system and thus, it is a big problem in a throughput to take such interference as noise.

Figure 9:
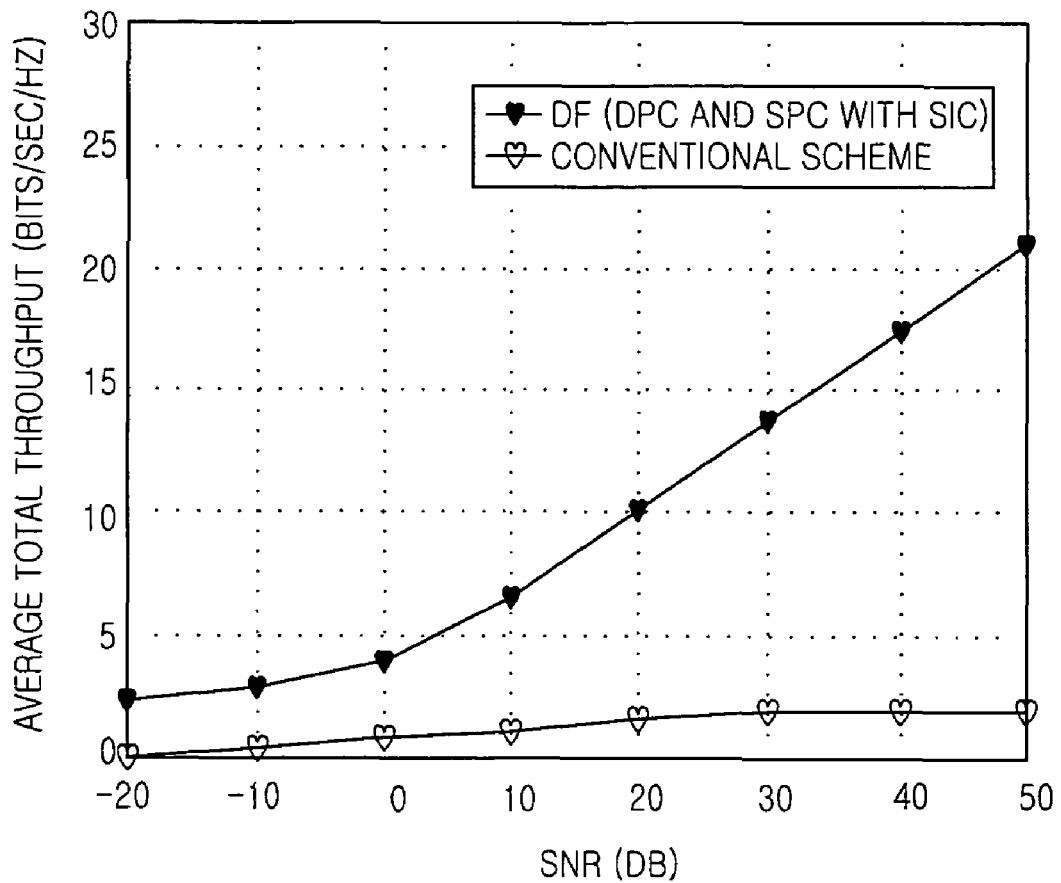
FIG. 9 is a graph illustrating a comparison of a difference of a throughput depending on a layer decoding scheme.

FIG. 9 is a graph illustrating a comparison of a difference of a throughput depending on a layer decoding scheme.

A throughput based on a proposed technology according to an exemplary embodiment of the present invention is described below with reference to FIG. 9. With an increase of an SNR, an increasing rate is relatively high. Compared to an SPC-SIC based technology, a DPC and SPC-SIC based technology can completely cancel interference in an MS because using DPC on the basis of shared common information. An increase of a throughput caused by this is shown in FIG. 9. In addition, in an exemplary embodiment of the present invention, a throughput in a 3 layer decoding structure is higher than a throughput obtained through a 2 layer decoding structure but a notice is that a difference is not so high. Thus, a 2 layer decoding technique for obtaining a throughput of any degree at low complexity can be additionally usefully used. Such a throughput increase is due to effectively canceling interference by partially decoding a signal of a different user in a multiuser channel environment. As described above, exemplary embodiments of the present invention can reduce an interference effect by a cooperative relay scheme through SPC in a multi-hop wireless communication system. Particularly, the system can prevent interference and enhance a communication throughput by implementing DPC based on SPC.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A multi-hop wireless communication system comprising:
    a first Base Station (BS) configured to transmit a signal comprising a first common information codeword and a first private information codeword to a first Relay Station (RS) and a second RS, wherein the first common information codeword is a codeword transmitted to all RSs and the first private information codeword is a codeword transmitted only to the first RS;
    a second BS configured to transmit a signal comprising a second common information codeword and a second private information codeword to the first RS and the second RS, wherein the second common information codeword is a codeword transmitted to all RSs and the second private information codeword is a codeword transmitted only to the second RS;

the first RS configured to joint-decode the first common information codeword and the second common information codeword and to decode the first private information codeword, wherein the second private information codeword comprises interference for the first RS; and the second RS configured to joint-decode the first common information codeword and the second common information codeword and to decode the second private information codeword, wherein the first private information codeword comprises interference for the second RS.

2. The system of claim 1, wherein transmit powers of the first private information codeword and the second private information codeword are determined in Equation below:

$$P_{1p} = \min\left(\frac{k_1}{|h_{12}|^2}, P_1\right),$$

$$P_{2p} = \min\left(\frac{k_1}{|h_{21}|^2}, P_2\right)$$

where,
$P_{1p}$: transmit power of first private information codeword,
$P_{2p}$: transmit power of second private information codeword,
$h_{12}$: channel coefficient between first BS and second RS,
$P_1$: maximum transmit power of first BS,
$h_{21}$: channel coefficient between second BS and first RS,
$P_2$: maximum transmit power of second BS, and
$k_1$: transmit power weight.

3. The system of claim 1, wherein transmit powers of the first common information codeword and the second common information codeword are determined in Equation below:

$$P_{1c}=P_1-P_{1p}, P_{2c}=P_2-P_{2p}$$

where,
$P_{1c}$: first common information codeword transmit power,
$P_{2c}$: second common information codeword transmit power,
$P_1$: maximum transmit power of first BS,
$P_2$: maximum transmit power of second BS,
$P_{1p}$: transmit power of first private information codeword, and
$P_{2p}$: transmit power of second private information codeword.

4. The system of claim 1, wherein the first RS is further configured to transmit a signal comprising a third common information codeword and a third private information codeword to a first Mobile Station (MS) and a second MS, wherein the second RS is further configured to transmit a signal comprising a fourth common information codeword and a fourth private information codeword to the first MS and the second MS, and further comprising:

the first MS, wherein the first MS is configured to joint-decode the third common information codeword and the fourth common information codeword and to decode the third private information codeword; and the second MS, wherein the second MS is configured to joint-decode the third common information codeword and the fourth common information codeword and to decode the fourth private information codeword.

5. The system of claim 4, wherein the third private information codeword is comprised of $x_{1pc}$ and $x_{1pp}$, and wherein the fourth private information codeword is comprised of $x_{2pc}$ and $x_{2pp}$.

6. The system of claim 4, wherein transmit powers of the third common information codeword, the third private information codeword, the fourth common information codeword, and the fourth private information codeword are determined in Equation below:

$$x'_{1c}:\alpha_1 Q_1,\ x_{1pc}:\alpha_1 Q_1-(1-\alpha_1)\alpha_2 Q_1,\ x_{1pp}:(1-\alpha_1)\alpha_2 Q_1$$

$$x'_{2c}:\alpha_2 Q_2,\ x_{2pc}:\alpha_2 Q_2-(1-\alpha_2)\alpha_1 Q_2,\ x_{2pp}:(1-\alpha_2)\alpha_1 Q_2$$

where,
$x'_{1c}$: third common information codeword,
$x'_{2c}$: fourth private information codeword,
$\alpha_1$: transmit power coefficient of third common information codeword, and real number between '0' and '1',
$\alpha_2$: transmit power coefficient of fourth common information codeword, and real number between '0' and '1',
$Q_1$: maximum transmit power of first RS, and
$Q_2$: maximum transmit power of second RS.

7. The system of claim 1, wherein the first RS is further configured to encode the first common information codeword, to generate a third common information codeword by performing Dirty Paper Coding (DPC) using the second common information codeword, and to transmit a signal comprising the third common information codeword and a third private information codeword to a first MS and a second MS, and wherein the second RS is further configured to encode the first common information codeword, to generate a fourth common information codeword by performing DPC using the second common information codeword, and to transmit a signal comprising the fourth common information codeword and a fourth private information codeword to the first MS and the second MS.

8. The system of claim 7, wherein the third private information codeword is comprised of $x_{1pc}$ and $x_{1pp}$, and wherein the fourth private information codeword is comprised of $x_{2pc}$ and $x_{2pp}$.

9. The system of claim 8, further comprising:

the first MS, wherein the first MS is configured to joint-decode the $x_{1pc}$ comprised in the third common information codeword and the $x_{2pc}$ comprised in the fourth common information codeword and to decode the $x_{1pp}$ comprised in the third private information codeword; and the second MS, wherein the second MS is configured to joint-decode the $x_{1pc}$ comprised in the third common information codeword and the $x_{2pc}$ comprised in the fourth common information codeword and to decode the $x_{2pp}$ comprised in the fourth private information codeword.

10. The system of claim 9, wherein transmit powers of the third common information codeword, the third private information codeword, the fourth common information codeword, and the fourth private information codeword are determined in Equation below:

$$x_{1c}:\alpha_1 Q_1,\ x_{2c}:\alpha_2 Q_2,\ x_{1pc}:\alpha_3\gamma_1 Q_1,\ x_{1pp}:\alpha_3\gamma_2 Q_1;\ \text{1st RS}$$

$$x_{1c}:\beta_2 Q_2,\ x_{2c}:\beta_2 Q_2,\ x_{2pc}:\beta_3\delta_1 Q_1,\ x_{2pp}:\beta_3\delta_2 Q_1;\ \text{2nd RS}$$

$$(\Sigma\alpha_i=1, \Sigma\gamma_j=1, 0\leq\alpha_i\leq 1, 0\leq\gamma_j\leq 1, i=1,2,3, j=1,2)$$

$$(\Sigma\beta_i=1, \Sigma\delta_j=1, 0\leq\beta_i\leq 1, 0\leq\delta_j\leq 1, i=1,2,3, j=1,2)$$

where,
$x_{jc}$: common information codeword transmitted by RSj,
$x_{jpc}$ and $x_{jpp}$: private information codeword transmitted by RSj, and $\alpha_j$, $\beta_j$,$\gamma_j$, and $\delta_j$: arbitrary variables.

11. An operation method of a first Base Station (BS) in a multi-hop wireless communication system, the method comprising:

transmitting, at the first BS, a signal comprising a first common information codeword and a first private information codeword to a first Relay Station (RS) and a second RS, wherein the first common information codeword is a codeword transmitted to all RSs and the first private information codeword is a codeword transmitted only to the first RS, wherein the first RS comprises a target node for the first private information codeword, the second RS comprises a target node for a second private information codeword transmitted by a second BS, the second private information codeword comprises interference for the first RS, and the first private information codeword comprises interference for the second RS, and wherein the first RS joint-decodes the first common information codeword received from the first BS and a second common information codeword received from the second BS, wherein the second common information codeword is a codeword transmitted to all RSs and the second private information codeword is a codeword transmitted only to the second RS.

12. The method of claim 11, wherein transmit powers of the first private information codeword and the second private information codeword are determined in Equation below:

$$P_{1p} = \min\left(\frac{k_1}{|h_{12}|^2}, P_1\right),$$

$$P_{2p} = \min\left(\frac{k_1}{|h_{21}|^2}, P_2\right)$$

where, $P_{1p}$: transmit power of first private information codeword,
$P_{2p}$: transmit power of second private information codeword,
$h_{12}$: channel coefficient between first BS and second RS,
$P_1$: maximum transmit power of first BS,
$h_{21}$: channel coefficient between second BS and first RS,
$P_2$: maximum transmit power of second BS, and
$k_1$: transmit power weight.

13. The method of claim 11, wherein the second common information codeword is transmitted by the second BS, and wherein transmit powers of the first common information codeword and the second common information codeword are determined in Equation below:

$$P_{1c} = P_1 - P_{1p}, P_{2c} = P_2 - P_{2p}$$

where, $P_{1c}$: first common information codeword transmit power,
$P_{2c}$: second common information codeword transmit power,
$P_1$: maximum transmit power of first BS,
$P_2$: maximum transmit power of second BS,
$P_{1p}$: transmit power of first private information codeword, and
$P_{2p}$: transmit power of second private information codeword.

14. An operation method of a first Relay Station (RS) in a multi-hop wireless communication system, the method comprising:

joint-decoding, at the first RS, a first common information codeword received from a first Base Station (BS) and a second common information codeword received from a second BS, wherein the first common information codeword and the second common information codeword are codewords transmitted to all RSs;

decoding, at the first RS, a first private information codeword received from the first BS; and transmitting, at the first RS, a signal comprising a third private information codeword comprised of $x_{1pc}$ and $x_{1pp}$ and a third common information codeword comprising $x'_{1c}$ to a first Mobile Station (MS) and a second MS, wherein the first RS comprises a target node for the first private information codeword, a second RS comprises a target node for a second private information codeword transmitted by a second BS, the second private information codeword is a codeword transmitted only to the second RS and comprises interference for the first RS, and the first private information codeword is a codeword transmitted only to the first RS and comprises interference for the second RS.

15. The method of claim 14, wherein transmit powers of the third common information codeword and the third private information codeword are determined in Equation below:

$$x'_{1c}:\alpha_1 Q_1, x_{1pc}:\alpha_1 Q_1-(1-\alpha_1)\alpha_2 Q_1, x_{1pp}:(1-\alpha_1)\alpha_2 Q_1$$

where, $x'_{1c}$: third common information codeword,
$\alpha_1$: transmit power coefficient of third common information codeword, and real number between '0' and '1', and
$Q_1$: maximum transmit power of RS.

16. The method of claim 14, further comprising:

encoding the first common information codeword, and generating the third common information codeword by performing Dirty Paper Coding (DPC) using the second common information codeword.

17. The method of claim 16, wherein transmit powers of the third common information codeword and the third private information codeword are determined in Equation below:

$$x_{1c}:\alpha_1 Q_1, x_{2c}:\alpha_2 Q_2, x_{1pc}:\alpha_3\gamma_1 Q_1, x_{1pp}:\alpha_3\gamma_2 Q_1$$

$$(\Sigma\alpha_i=1, \Sigma\gamma_j=1, 0\leq\alpha_i\leq 1, 0\leq\gamma_j\leq 1, i=1,2,3, j=1,2)$$

where, $x_{jc}$: common information codeword transmitted by RSj,
$x_{jpc}$ and $x_{jpp}$: private information codeword transmitted by RSj, and
$\alpha_j, \beta_j, \gamma_j,$ and $\delta_j$: arbitrary variables.

18. An operation method of a Mobile Station (MS) in a multi-hop wireless communication system, the method comprising:

receiving a signal comprising a first private information codeword comprised of $x_{1pc}$ and $x_{1pp}$ and a first common information codeword transmitted by a first Relay Station(RS), and a signal comprising a second private information codeword comprised of $x_{2pc}$ and $X_{2pp}$ and a second common information codeword transmitted by a second RS, wherein the first common information codeword and the second common information codeword are codewords transmitted to all RSs, the first private information codeword is a codeword transmitted only to the first RS and the second private information codeword is a codeword transmitted only to the second RS;

joint-decoding the first common information codeword and the second common information codeword;

joint-decoding the $x_{1pc}$ and $x_{2pc}$; and decoding the $x_{1pp}$, wherein the second private information codeword comprises interference for the first RS, and the first private information codeword comprises interference for the second RS.

19. The method of claim 18, wherein the signal transmitted by the first RS is encoded by the first RS with Dirty Paper Coding based on the second common information codeword.

* * * * *